No. 685,185. Patented Oct. 22, 1901.
J. H. SMITH.
FISHING REEL.
(Application filed July 2, 1901.)
(No Model.)
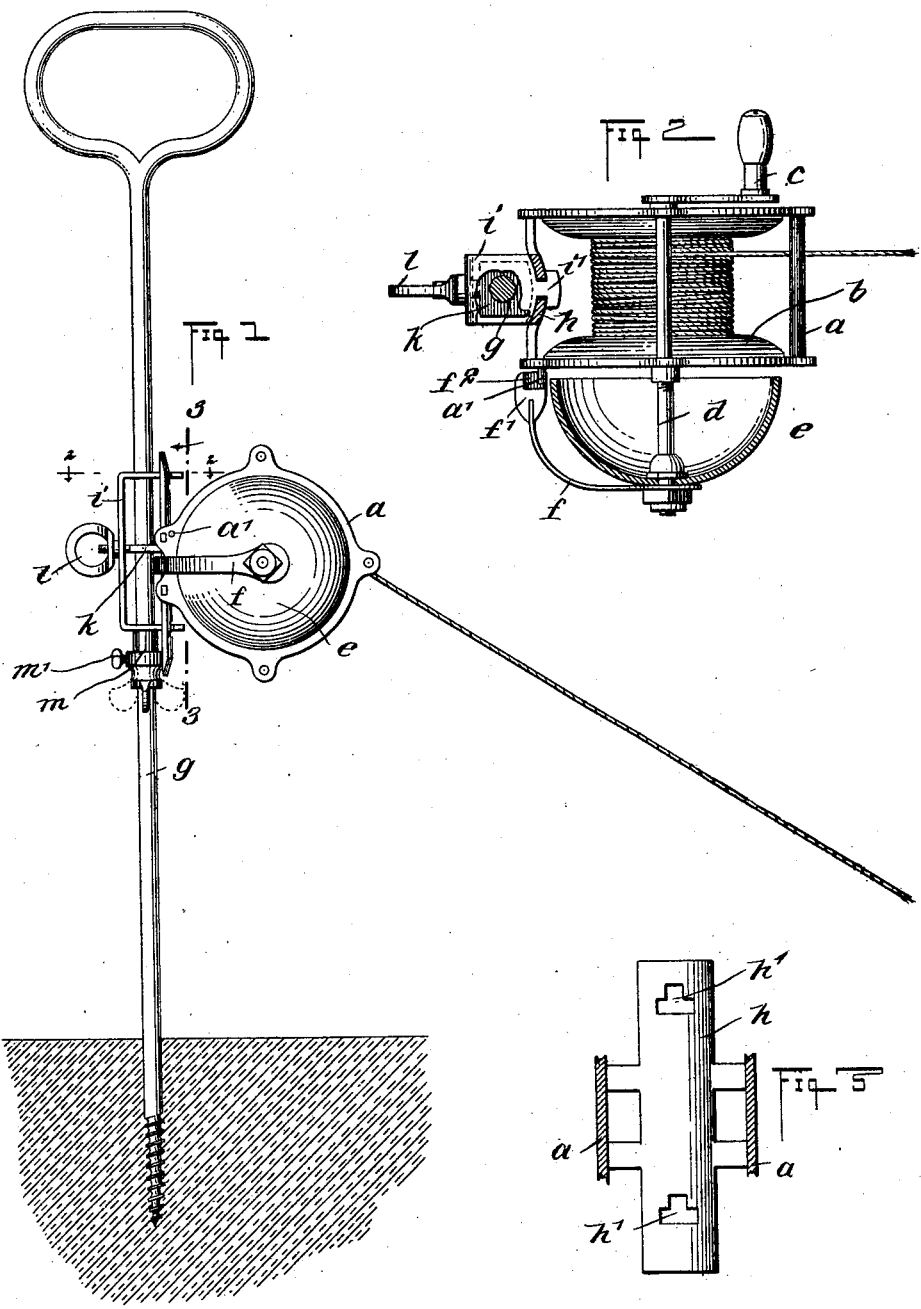
WITNESSES:
INVENTOR
James H. Smith
BY Munn & Co.
ATTORNEYS

UNITED STATES PATENT OFFICE.

JAMES H. SMITH, OF SALISBURY MILLS, NEW YORK.

FISHING-REEL.

SPECIFICATION forming part of Letters Patent No. 685,185, dated October 22, 1901.

Application filed July 2, 1901. Serial No. 66,817. (No model.)

*To all whom it may concern:*

Be it known that I, JAMES H. SMITH, a citizen of the United States, and a resident of Salisbury Mills, in the county of Orange and State of New York, have invented a new and Improved Fishing-Reel, of which the following is a full, clear, and exact description.

This invention relates to a reel for fishing-lines; and the prime object of the invention is to provide a device which will give to the fisherman a signal the instant that the hook has been taken by a fish.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1 is a side elevation of the invention. Fig. 2 is a plan view with parts in section on the line 2 2 of Fig. 1, and Fig. 3 is a sectional elevation on the line 3 3 of Fig. 1.

The device comprises a frame $a$, which may be of the ordinary construction and in which is mounted the reel proper, $b$, also of the ordinary construction.

$c$ indicates the crank for controlling the reel. The axle of the reel proper, $b$, has an extension $d$, carrying fixedly a bell $e$, and a spring-arm $f$, having a clapper $f'$. This spring-arm is located outside of the bell $e$ and extends around the same to the frame $a$, at which point the clapper $f'$ is located. The clapper has a beveled face $f^2$, adapted to run against a stud $a'$ on the frame $a$. Now the instant that the reel proper, $b$, is turned in either direction the parts $e$, $f$, and $f'$ will be moved in unison with the movement of the reel, and as the inclined face $f^2$ of the clapper $f'$ runs against the stud $a'$ the spring-arm $f$ will be flexed slightly and then as the clapper clears the stud $a'$ the spring-arm will in quickly returning move beyond its normal position and the clapper will be struck against the bell, thus sounding it. This sounding of the bell will take place once for every revolution of the reel $b$, and therefore the instant that a fish takes the line and the reel begins to move the bell will ring steadily.

This invention is applicable to a pole of the usual construction or to any other suitable supporting means. For example, a staff $g$ may be employed, this staff being constructed of metal, having a screw-threaded lower end adapted to be fastened into a boat, a dock, or the like. The frame $a$ carries a plate $h$, extending vertically at the rear of the reel, and this plate is engaged with a U-bar $i$ by means of the headed ends $i'$ of said bar being engaged with the plate $h$. A yoke $k$ encircles the rod or staff $g$ and projects loosely through the U-bar $i$, it being provided with a thumb-nut $l$, so that by operating the nut the U-bar $i$ may be tightened firmly against the staff $g$ and all of the parts held properly in place. The headed projections $i'$ of the U-bar $i$ engage with T-slots in the plate $h$, such slots being indicated at $h'$ in Fig. 3, and it will be observed that the U-bar may be disengaged from the plate $h$ when desired, and then the reel may be attached to an ordinary pole by engaging the plate $h$ with the usual reel-fastenings of the pole.

If desired, a collar $m$ may be adjustably fastened to the post $g$ by a set-screw $m'$. This allows the nut $l$ to be relaxed, and the reel may then turn freely around on the post to any position, accommodating the strain of the fish on the line.

Having thus described my invention, I claim as new and desire to secure by Letters Patent—

1. The combination of a frame, a reel mounted therein, a bell, a spring-sustained clapper arranged to turn simultaneously with the reel, and means for striking the clapper against the bell.

2. The combination of a frame, a reel mounted therein, a bell, a spring-sustained clapper arranged to turn simultaneously with the reel, the said clapper having an inclined surface, and a stud supported stationarily with respect to the clapper and adapted to be engaged by the inclined surface thereof, for the purpose specified.

3. The combination of a frame, a reel mounted therein, a bell supported on an extension of the axle of the reel, a clapper carried on said extension of the reel and movable therewith, and means for striking the clapper against the bell.

4. The combination of a frame and a reel mounted therein, a bar removably engaged with a part of the frame, and means for clamping the bar against a support.

5. The combination of a frame, a reel carried therein, a part of the frame having a T-slot, a bar having an enlarged head removably engaged with the T-slot, and means for clamping the bar against the support.

6. The combination of a frame, a reel mounted thereon, a bell, a clapper arranged to move in unison with the movements of the reel, and means for causing the clapper during its movement to strike the bell.

In testimony whereof I have signed my name to this specification in the presence of two subscribing witnesses.

JAMES H. SMITH.

Witnesses:
 FRANCIS E. BEAUMONT,
 E. RAYMOND HULL.